United States Patent [19]

Wilkinson

[11] Patent Number: 5,512,026
[45] Date of Patent: Apr. 30, 1996

[54] METHOD OF USING A MODULAR STEP EXERCISE UNIT

[76] Inventor: William T. Wilkinson, P.O. Box 572, Crownsville, Md. 21032-0572

[21] Appl. No.: 248,717

[22] Filed: May 25, 1994

Related U.S. Application Data

[60] Division of Ser. No. 96,408, Jul. 26, 1993, Pat. No. 5,345,247, which is a continuation-in-part of Ser. No. 82,099, Jun. 28, 1993, which is a continuation-in-part of Ser. No. 967,711, Oct. 28, 1992, Pat. No. 5,275,579, and a continuation-in-part of Ser. No. 69,740, Jun. 1, 1993, Pat. No. 5,352,168, which is a continuation-in-part of Ser. No. 891,178, May 29, 1992, Pat. No. 5,248,286, which is a division of Ser. No. 718,754, Jun. 21, 1991, Pat. No. 5,118,096, which is a division of Ser. No. 588,449, Sep. 26, 1990, abandoned, said Ser. No. 69,740, is a continuation-in-part of Ser. No. 967,711, which is a continuation-in-part of Ser. No. 754,075, Sep. 3, 1991, Pat. No. 5,162,028, and a continuation-in-part of Ser. No. 698,382, May 10, 1991, Pat. No. 5,184,987.

[51] Int. Cl.⁶ ........................................................ A63B 5/00
[52] U.S. Cl. ................................ 482/52; 482/51; 482/148
[58] Field of Search ................................. 482/51, 52, 148, 482/141; 297/423.4, 461, 423.441, 383; 248/346; 108/53.1, 53.5, 143, 90.1, 97

[56] References Cited

U.S. PATENT DOCUMENTS

| | | | |
|---|---|---|---|
| 2,097,273 | 10/1937 | Feist | 482/52 |
| 5,094,505 | 3/1992 | Nichols | 297/423.41 |
| 5,118,101 | 6/1992 | Belli | 482/52 |
| 5,234,396 | 8/1993 | Wilkinson | 482/52 |

Primary Examiner—Jerome Donnolly
Attorney, Agent, or Firm—Connolly & Hutz

[57] ABSTRACT

A modular step exercise unit includes a plurality of individual steps. Each step is in the form of a base having a horizontal platform which comprises the upper surface of the base with depending sides forming an apron which terminates in a plane parallel to the platform so that the apron can be placed directly on a support surface, such as a floor. The steps may be made of differing size so that during storage or even in certain use conditions, steps which are not being used can be stored within the periphery of the apron of the largest step. A multi-level step can be formed by mounting a smaller step on a larger step. The individual steps could be used abutting each other or spaced from each other to provide a multi-level arrangement which includes individual steps and the floor. If desired the steps could be of the same size as each other which would eliminate the advantage of storing the steps within each other during non-use, but would have the advantage of providing a more symmetrical exercise unit by equal sized steps.

2 Claims, 3 Drawing Sheets

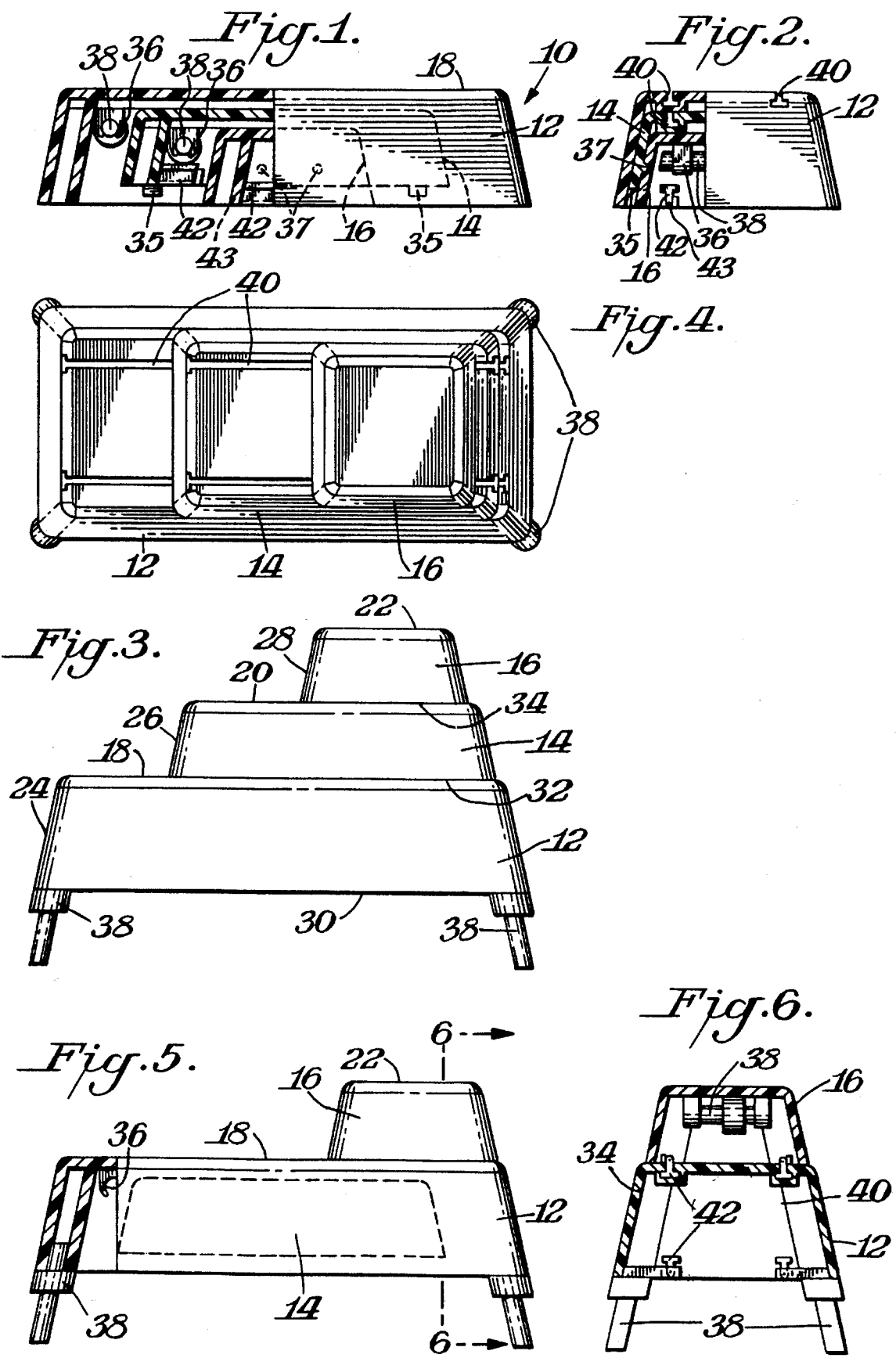

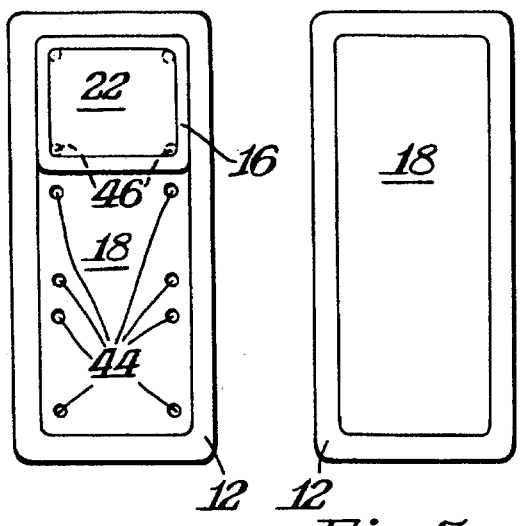
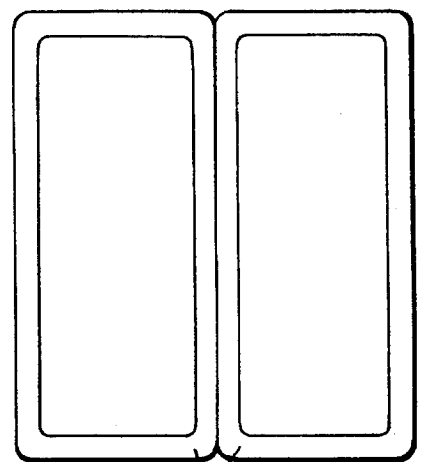
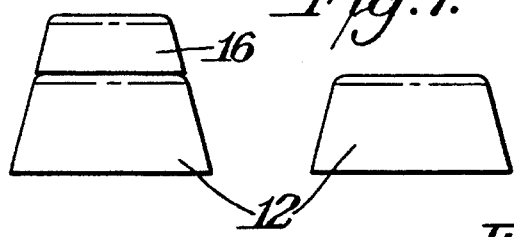
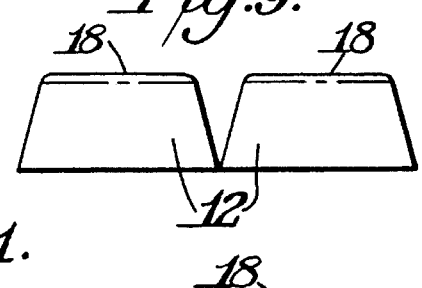
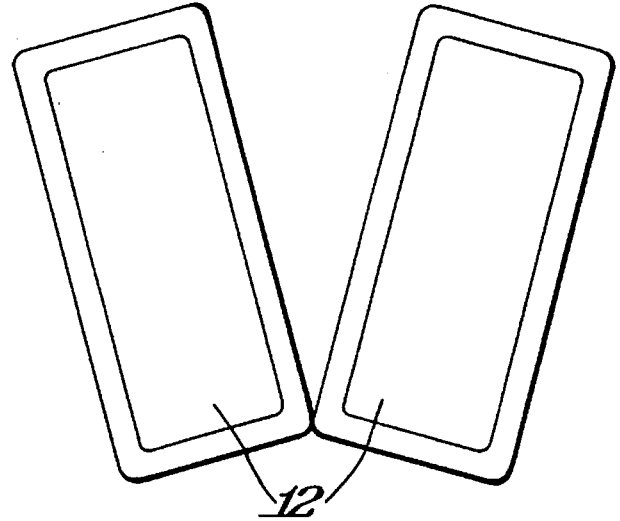

5,512,026

1

METHOD OF USING A MODULAR STEP EXERCISE UNIT

CROSS-REFERENCE TO RELATED APPLICATIONS

This application is a division of application Ser. No. 96,408 now U.S. Pat No. 5,354,247 filed Jul. 26, 1993 which in turn is a continuation in part of application Serial No. 08/082,099 pending filed Jun. 28, 1993 which in turn is a continuation-in-part of application Ser. No. 07/967,711 filed Oct. 28, 1992 now U.S. Pat. No. 5,275,579 and application Ser. No. 07/069 740 now U.S. Pat. No. 5,352,168 filed Jun. 1, 1993 which in turn is a continuation-in-part of application Ser. No. 07/891,178 now U.S. Pat. No. 5,248,286, filed May 29, 1992, which in turn is a division of application Ser. No. 07/718,754 filed Jun. 21, 1991, now U.S. Pat. No. 5,118,096 and which is a division of application Ser. No. 07/588,449, filed Sep. 26, 1990, now abandoned. Application Ser. No. 07/069,740 now U.S. Pat. No. 5,352,168, is also a continuation-in-part of application Ser. No. 07/967,711 now U.S. Pat. No. 5,275,579 filed Oct. 28, 1992 which in turn is a continuation-in-part of application Ser. No. 754,075, filed Sep. 3, 1991 now U.S. Pat. No. 5,162,028 and a continuation-in-part of application Ser. No. 07/698,392, filed May 10, 1991, now U.S. Pat. No. 5,184,987.

BACKGROUND OF THE INVENTION

Various forms of aerobic exercise are intended to develop different parts of the body. The above noted parent applications and patents disclose different forms of steps which could be used to supplement an aerobic exercise by permitting the user to step up and down from a horizontal platform to the floor. In general, the steps of the above parent patents and applications include some form of adjustability to permit the exercise program to conform to the particular individuals. This is generally accomplished by providing height adjustability so that a selective number of different heights can be provided for the platform. Parent U.S. Pat. No. 5,162,028 also provides for width adjustability.

Parent application Ser. No. 82,099 filed Jun. 28, 1993 provides a departure from the conventional single level step approach by permitting the user to have multiple height step levels during the same exercise program.

Current step aerobics has focused, however, on the use of only one step to do an exercise routine. While the multi-level techniques described in parent application Ser. No. 82,099 provides a distinct variation to the conventional single step techniques, it would also be desirable if some step exercise unit could be provided which utilizes a plurality of individual steps to achieve not only height variance, but also provide sufficiently large stepping platforms.

SUMMARY OF THE INVENTION

An object of this invention is to provide a modular step exercise unit and method of use which meets the above needs.

A further object of this invention is to provide such a modular step exercise unit and method which in one practice can involve a plurality of individual steps of different size so that when a step is not being used it could be nested within a larger step which is being used or for storage purposes.

In accordance with one practice of this invention a modular step exercise unit comprises a plurality of individual steps. Each step is in the form of a base having a horizontal platform as its upper surface with downwardly depending sizes terminating in a plane parallel to the horizontal platform for resting directly on the floor. In a preferred practice of the invention the steps are of differing sizes so that when a step is not being used it could be nested within the periphery of the apron formed by the depending sides of the largest step. Alternatively, smaller steps could be placed atop a larger step to provide a multi-level unit or the smaller step could be placed adjacent to or near a larger step to provide a multi-level stepping unit which would include the floor and the two separate steps.

The individual steps could be of equal or unequal height or of equal or unequal shape. Where equal heights and shapes are used the storability feature is lost, but a more uniform stepping unit results. The individual steps could also be height adjustable by the incorporation of legs as disclosed in the various parent patents and applications. Where legs are used the legs could be detachable and the individual steps could have clips or some type of mounting means so that the same legs could be selectively attached to any of the steps and stored in the steps during nonuse.

THE DRAWINGS

FIG. 1 is a side elevational view partly broken away and in section of a modular step exercise unit in accordance with this invention wherein individual steps are nested within the largest step;

FIG. 2 is a end elevational view partly broken away and in section of the modular step exercise unit shown in FIG. 1;

FIG. 3 is a side elevational view of the modular step exercise unit shown in FIGS. 1–2 with individual steps stacked atop each other;

FIG. 4 is a top plan view of the modular step exercise unit shown in FIG. 3;

FIG. 5 is a side elevational view partly broken away and in section showing a variation of use for the modular step exercise unit of this invention;

FIG. 6 is a cross-sectional view taken from FIG. 5 along the line 6—6;

FIG. 7 is an end elevational view showing an optional use of individual steps from a modular step exercise unit in accordance with a further embodiment of invention;

FIG. 8 is a top plan view of the modular step exercise unit shown in FIG. 7;

FIG. 9 is a side elevational view similar to FIG. 7, but showing the steps in an alternate arrangement;

FIG. 10 is a top plan view of the modular step exercise unit shown in FIG. 9;

FIG. 11 is an end elevational view showing yet another form of step arrangement for a modular step exercise unit in accordance with this invention;

FIGS. 12–13 are a top plan views of a further arrangements for a modular step exercise unit of this invention;

Detailed Description

Figure 13:
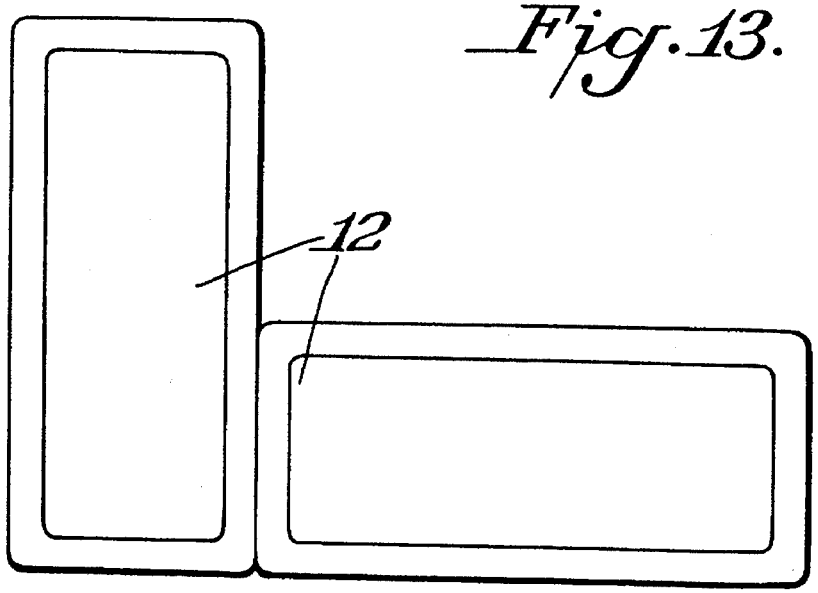

The present invention is based upon the concept of using one or more steps in an aerobic work out. The invention includes a modular step unit that comprises at least one step for a multi-step work out. In general the steps can be adjustable, non-adjustable or a mix of adjustable and non-adjustable. The steps can be a multi-level or a single level either adjustable or non-adjustable. The invention also features a modular step exercise unit where one or more steps and if desired adjustable legs can be stored in a nested condition inside the largest step for compactness and easy storage.

In practice the steps can be configured on the floor in a number of different arrangements to provide varied stepping routines. For example, the steps could be parallel with a long side exposed adjacent each other or could be aligned with the short sides adjacent each other. Alternatively, the steps could be arranged in a V-shape or a T-shape or an L-shape.

A particularly advantageous feature of one practice of the invention is the utilization of a set of legs which could be selectively mounted to each step to allow for flexibility in various height levels. Alternatively, more than one step could have its own set of legs.

A further feature of the invention is the ability to stack individual steps atop each other for obtaining different height levels.

FIGS. 1–6 show a modular step exercise unit 10 in accordance with one embodiment of this invention. As shown therein a plurality of steps 12, 14, and 16 is provided to comprise the components of the modular step exercise unit 10. As best illustrated in FIGS. 3–4 step 12 is of larger size than step 14 which in turn is of larger size than step 16. Each step includes a horizontal platform 18, 20, 22 as its upper surface with depending side walls 24, 26, 28 forming an apron. The apron may be continuous or interrupted. Each side wall terminates at its lower edge 30, 32, 34 in a plane parallel to its respective upper surface. Thus, each step could be placed directly on the floor with the lower surface or edge 30, 32, 34 resting on the floor and the corresponding upper surface 18, 20, 22 would be disposed in a horizontal orientation to act as a stepping platform.

Because the individual steps are dimensioned of correspondingly smaller size from large step 12 to intermediate step 14 to small step 16, it is possible during periods of non-use, particularly non-use of intermediate and small steps 14, 16 to store the intermediate and small steps 14, 16 nested within large step 12 as illustrated for example in FIGS. 1–2.

In order to facilitate the nesting of the steps in the illustrated manner, suitable mounting means may be provided to lock the steps in their stored condition. FIGS. 1–2, for example, illustrate the steps 14 and 16 to be nested within the apron 24 of large step 12. One manner of providing a positive coupling of the steps in their stored condition would be to provide each step with a wedge detent 35 designed to snap into a socket 37. For example, the wedge 35 of intermediate step 14 would snap into a corresponding socket of large step 12. Similarly, a wedge 35 of small step 16 would snap into a socket of either intermediate step 14 or large step 12.

If desired the intermediate step 14 and small step 16 could be loosely mounted inside large step 12 when only step 12 is used. For storage and transportation a strap could be looped around step 12 to retain steps 14 and 16 nested therein. It is preferred, however, to have engagement of the nested steps such as previously described or by clips or other suitable mounting members.

An additional feature of the storage capability of device 10 is the inclusion of mounting members such as spring clips 36 on the inner surface of the various steps for engaging detachable legs 38 during periods of non-use of the legs.

It is to be understood that although FIGS. 1–6 illustrate the utilization of three individual different size steps in the modular step exercise unit 10, the invention may be practiced with a larger or lesser number of steps. In the practice illustrated in FIGS. 1–6 the individual modules or steps provide a wide range of work outs, yet store compactly in a single unit. In addition, the individual modules may be economically molded from a suitable plastic material. The height of large step 12 may be 6 inches while the intermediate step 14 may be 4 inches high and the small step 16 may be 2 inches high. Alternatively, intermediate step 14 may be 2 inches high and small step 16 may be 4 inches high although this would limit the nesting feature. Additional height adjustment is achieved through detachable legs 38 which may elevate the unit by 2 inch or greater or lesser increments. The detachable legs may take various forms such as described in the parent patents and applications, the details of which are incorporated herein by reference thereto.

Device 10 thus provides a range of a single step height which could increase from a low height of 4 inches and then increase by 2 inch increments up to for example 18 inches. In order to securely stack one step atop each other, suitable guide members may be used. FIGS. 2, 4 and 6, for example, illustrate the upper surface of each step to include a groove 40 which may be of any suitable shape such as the T-shape illustrated therein. A correspondingly shaped track member 42 may be provided on the lower surface of the steps for sliding in the respective grooves as best shown in FIG. 6. If desired an abutment or stop member may be provided at the end of each groove 40 near the periphery to prevent the respective steps from being pushed too far and then not properly seated on its lower step.

Tracks 42 are mounted in an inverted position during periods of non-use, as shown in FIGS. 2 and 6. This is achieved by pivoting each track 42 on a pivot pin 43 so that the tracks could be disposed within the periphery of its side walls during non-use, as illustrated by the tracks 43 at the lower surface of large step 12 whereas tracks 42 are pivoted to their use position as also shown in FIG. 6 by the tracks from small step 16 riding in the grooves 40 on the upper surface 18 of large step 12. Tracks 42 may be spring biased to their non-use position. During use, the tracks 42 would be rotated 180° and held in that position by their sliding engagement in grooves 40.

FIGS. 1–2 illustrate one practice of the invention wherein device 10 is utilized by having the large step 12 provide a single height level for the aerobic exercise. In this practice, inactive steps 14, 16 are nested in step 12.

FIGS. 3–4 illustrate the use of all three steps to provide three different height elevations from the steps with the floor providing a fourth elevation. The floor would also provide an additional elevation for the practice shown in FIGS. 1–2. In FIGS. 3–4 adjustably and detachably mounted legs 38 also provide for further elevations of the unit 10. Such legs may also be used for the practice of FIGS. 1–2.

FIGS. 5–6 illustrate a variation wherein the intermediate step 14 is stored within large step 12 and the remaining modules 12 and 16 provide two height elevations with the entire unit being selectively elevated by legs 38. Alternatively, step 14 may be used and step 16 nested in step 12.

FIGS. 7 and 8 illustrate a variation of the invention wherein a pair of large steps 12 are utilized with a small step 16. Step 16 could be mounted on its corresponding large step in any suitable manner. As shown, at least one of the large steps 12 includes three sets of holes 44 (with four holes in each set) which are adapted to receive corresponding posts or pegs 46 at the lower surface of step 16. Thus, step 16 could be mounted at either end or in the center of the upper surface 18 of large step 12. The two large steps 12 would be placed side by side in a parallel manner as shown in FIGS. 7–8. This would provide the user with an elevation resulting from the upper surface 18 of the right hand step, an elevation from the floor itself, a further elevation from surface 18 and a higher elevation from the upper surface 22 of small step 16. This large number of elevations provides a variety of different possible aerobic stepping exercises that could be performed.

If desired, the arrangements shown in FIGS. 1–6 may be utilized in the manner shown in FIGS. 7–8 by having the intermediate step 14 or small mounted along side the large step and stacking the remaining step on one of the other steps.

A further variation of the practice of FIGS. 7–8 would be to straddle one step across two lower steps. For example, a pair of steps 12,12 having holes 44 could be placed side by side in abutment or spaced from each other. A third step having posts 46 would straddle the lower steps 12,12 by having two posts 46 in the holes 44 of one step 12 with the remaining two posts in the holes 44 of the other step 12.

FIGS. 9–10 illustrate a further variation wherein two steps 12,12 are juxtaposed with their lower surfaces abutting each other to permit the user to step on either of the upper surfaces 18,18 and/or the floor.

FIG. 11 shows a variation wherein the steps 12,12 are mounted end to end to provide a pair of longitudinally aligned platforms 18,18.

FIG. 12 shows yet another variation wherein the steps 12,12 are disposed near each other with one corner of each generally rectangular step abutting a corresponding corner of the other step to form a V-formation.

FIG. 13 shows use of the modules 12,12 with the end of one module abutting the side of the other module to form an L-shape.

Figure 15:
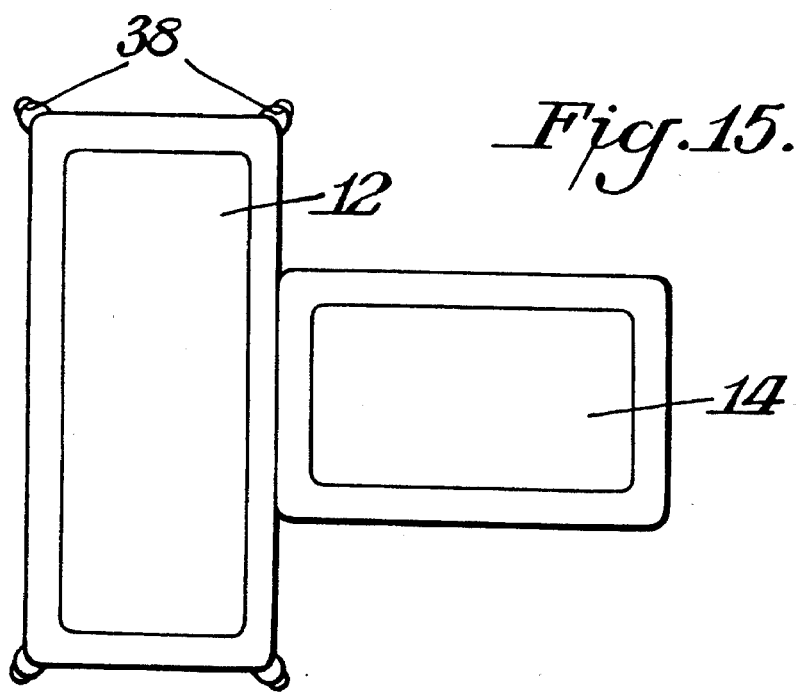
FIG. 15 is a top plan view of the modular step exercise unit shown in FIG. 14.
Figure 14:
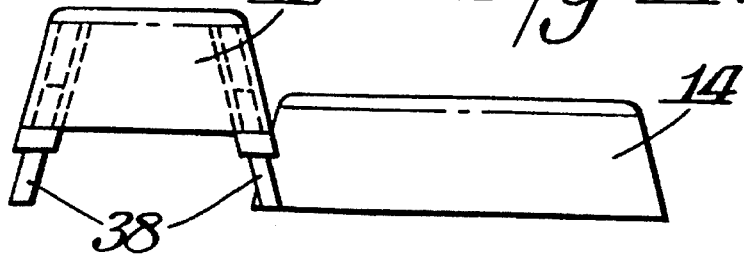
FIG. 14 is an end elevational view of yet another form of modular step exercise unit in accordance with this invention.

FIGS. 14–15 show a further variation wherein a module 14 has its end in abutment with module 12 to form a T. In addition, different heights are achieved by providing one of the modules 12 with detachable legs 38.

Although various figures using two non-connected modules illustrate the modules of being of the same size, the invention may be practiced where the modules are of different size, shape or height. The various figures are merely exemplary of the wide variety of arrangements that can be achieved by the practice of this invention. Similarly, the illustrated practices could be practiced with more than two steps. The additional steps could abut or be spaced from their adjacent steps. Additionally, some or all of the steps could have smaller steps stacked thereon.

It is also to be understood that where specific mounting means are shown, such as tracks in grooves (FIGS. 2 and 6) or posts in holes (FIG. 8), other types of mounting means may be used within the spirit of this invention such as suction cups, hooks and loops and adhesive strips. Any of the features described for a specific practice may be used for other described practices.

In general, the invention provides the user with the option of many different step configurations to perform specialized techniques best suited for that user. The basic method would involve stepping up and down from one or more steps of equal or varying heights. The stepping could be in a forward, diagonal, backward or side ways directions or a combination of these directions. In addition the exercise could include kicks. The step routines would be done by using one or more of the basic configurations illustrated herein, but could involve any other multi-step modular configurations.

The step routines could also include warm-up, cool-down, stretching and calisthenics exercises such as push-ups, dips, sit-ups, ups,leg stretches, heel stretches, leg raises, calf stretches and toe raises. The step routines could also include various type of equipment, such as elastic bands, pull-up pulleys/cords or cables, weights, dumbbells, shafts, ankle/wrist weights, etc.

The invention could be practiced by using steps of equal or differing height. Where two or more steps are used with each being placed directly on the floor, the user could step up and down from one step then to the other. Alternatively the user could step with each foot on a different step. The user could also step on one step with one or both feet and then cross over with one or both feet to the other step without first stepping on the floor. The steps could be used for warm-up exercises with dips or push-ups with one limb (hand or foot) on or against different steps while the user lays on the floor.

It is to be understood that as used herein the terms "step" or "stepping" are meant to include more vigorous forms of stepping, such as hopping or jumping.

It is also to be understood that although the various steps are illustrated as being of generally rectangular shape with outwardly sloping side walls, the invention could be practiced with other shapes and with vertical side walls.

What is claimed:

1. In a method of performing a step aerobic exercise routine comprising:

providing a modular step aerobic kit including at least;

a first stepping unit having a length, a horizontal upper surface and a lower section configured to be supported on a support surface such as a floor, a second stepping unit have a length, a horizontal upper surface and a lower surface configured to be supported on a support surface such as a floor, the length of said second stepping unit being less than the length of said first stepping unit, said first stepping unit having engagement means thereon to allow mateable engagement with said second stepping unit, and said second stepping unit having complimentary engagement means for mateable engagement with said engagement means of said first stepping unit, to thereby allowing said second stepping unit to be detachably mounted on said upper surface of first stepping unit wherein a portion of said upper surface of first stepping unit is exposed, said exposed portion being of a size of sufficient area to support the entire foot of a user, said method of use further including the steps of selecting at least the first and second stepping units from said kit and orienting said stepping units in a desired orientation relative to each other, wherein said orientation is selectable from either said steps being placed adjacent each other, on a supporting surface or in an orientation wherein said second stepping unit is mountably stacked on top of said first stepping unit, and;

repeatedly stepping from said first stepping unit to said second stepping unit.

2. The method of claim 1 including repeatedly stepping to and from a support surface and to and from at least one of the stepping units during the step aerobic exercise routine.

* * * * *